United States Patent
Brink et al.

(10) Patent No.: US 8,914,267 B2
(45) Date of Patent: Dec. 16, 2014

(54) SYSTEMS AND METHODS FOR DIAGNOSING PRODUCTION PROBLEMS IN OIL FIELD OPERATIONS

(75) Inventors: James Lee Brink, Bakersfield, CA (US); Dallas Tubbs, Bakersfield, CA (US); Kenan Oran, Bakersfield, CA (US); James Richard Ouimette, Santa Rosa, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 1102 days.

(21) Appl. No.: 12/175,680

(22) Filed: Jul. 18, 2008

(65) Prior Publication Data

US 2009/0125367 A1  May 14, 2009

Related U.S. Application Data

(60) Provisional application No. 60/950,505, filed on Jul. 18, 2007, provisional application No. 60/950,533, filed on Jul. 18, 2007.

(51) Int. Cl.
*G06G 7/48* (2006.01)
*G06Q 10/06* (2012.01)
*G06Q 50/02* (2012.01)

(52) U.S. Cl.
CPC .............. *G06Q 50/02* (2013.01); *G06Q 10/06* (2013.01); *G06Q 10/06395* (2013.01)
USPC ................................ 703/10; 703/6; 705/7.14

(58) Field of Classification Search
None
See application file for complete search history.

(56) References Cited

U.S. PATENT DOCUMENTS

| | | | | |
|---|---|---|---|---|
| 4,414,661 A | * | 11/1983 | Karlstrom | 370/332 |
| 4,796,466 A | * | 1/1989 | Farmer | 73/40.5 R |
| 4,956,875 A | * | 9/1990 | Bernard et al. | 455/13.1 |
| 5,784,540 A | * | 7/1998 | Faltings | 706/46 |
| 6,076,049 A | * | 6/2000 | Lievois et al. | 702/100 |
| 6,222,482 B1 | * | 4/2001 | Gueziec | 342/357.34 |
| 6,243,483 B1 | * | 6/2001 | Petrou et al. | 382/103 |
| 6,606,529 B1 | | 8/2003 | Crowder, Jr. et al. | |
| 6,611,755 B1 | * | 8/2003 | Coffee et al. | 701/482 |

(Continued)

OTHER PUBLICATIONS

Holder, T., Teutsch, G., Ptak, T., Schwarz, R., 1998. A new approach for source zone characterization: the Neckar Valley study. Groundwater Quality: Remediation and Protection, IAHS Publication, vol. 250. IAHS Press, Wallingford, Oxfordshire, UK, pp. 49-55.*

(Continued)

*Primary Examiner* — Gurkanwaljit Singh
(74) *Attorney, Agent, or Firm* — Merchant & Gould P.C.

(57) ABSTRACT

Systems and methods for diagnosing production problems in oil field operations are provided. A first video monitor displays an oil field diagnosis process flow chart that includes selectable objects such as Review Well Test Differences, Review Sliders, Review Bad Actors, and Perform Steam Flood Performance Check. Each selectable object is associated with one or more incompatible domain-specific software applications. One or more of the selectable objects are selected and one or more additional video monitors display reports extracted by a middle-ware software code segment layer from the associated domain-specific software applications. Oil wells having production problems are listed and problem oil wells are displayed on an oil field map. Any commonalities among the displayed problem oil wells indicative of a common cause of the production problems are visually identified. Work is scheduled in the associated domain-specific software applications sufficient to remedy the common cause.

25 Claims, 9 Drawing Sheets

(56) References Cited

U.S. PATENT DOCUMENTS

| | | | |
|---|---|---|---|
| 6,683,614 B2* | 1/2004 | Walls et al. | 345/506 |
| 6,868,340 B2* | 3/2005 | Alexander et al. | 702/5 |
| 6,920,618 B2* | 7/2005 | Walls et al. | 715/840 |
| 6,963,817 B2 | 11/2005 | Ito et al. | |
| 7,096,092 B1 | 8/2006 | Ramakrishnan et al. | |
| 7,231,415 B1 | 6/2007 | Eslambolchi et al. | |
| 7,359,931 B2* | 4/2008 | Tarabzouni et al. | 709/200 |
| 7,584,165 B2* | 9/2009 | Buchan | 706/60 |
| 7,596,608 B2* | 9/2009 | Alexander et al. | 709/217 |
| 7,725,302 B2* | 5/2010 | Ayan et al. | 703/10 |
| 7,739,138 B2* | 6/2010 | Chauhan et al. | 705/7.14 |
| 7,809,537 B2* | 10/2010 | Hemanthkumar et al. | 703/10 |
| 7,963,327 B1* | 6/2011 | Saleri et al. | 166/252.1 |
| 7,996,150 B2* | 8/2011 | Nishida | 701/472 |
| 2002/0042700 A1* | 4/2002 | Giles et al. | 703/6 |
| 2002/0069312 A1* | 6/2002 | Jones | 711/100 |
| 2002/0077953 A1* | 6/2002 | Dutta | 705/37 |
| 2002/0143469 A1* | 10/2002 | Alexander et al. | 702/2 |
| 2003/0088534 A1 | 5/2003 | Kalantar et al. | |
| 2003/0212494 A1* | 11/2003 | Alexander et al. | 702/5 |
| 2003/0227392 A1* | 12/2003 | Ebert et al. | 340/825.49 |
| 2004/0088113 A1* | 5/2004 | Spoonhower et al. | 702/2 |
| 2004/0145241 A1* | 7/2004 | Arakawa et al. | 307/10.3 |
| 2004/0148083 A1* | 7/2004 | Arakawa et al. | 701/50 |
| 2004/0153437 A1 | 8/2004 | Buchan | |
| 2004/0198254 A1* | 10/2004 | Mizui et al. | 455/99 |
| 2004/0236620 A1* | 11/2004 | Chauhan et al. | 705/9 |
| 2005/0119911 A1* | 6/2005 | Ayan et al. | 705/1 |
| 2006/0187017 A1* | 8/2006 | Kulesz et al. | 340/506 |
| 2007/0016389 A1* | 1/2007 | Ozgen | 703/10 |
| 2009/0150779 A1* | 6/2009 | Kodama et al. | 715/708 |

OTHER PUBLICATIONS

S. Bauer et al., "Quantification of groundwater contamination in an urban area using integral pumping tests" Journal of Contaminant Hydrology; vol. 75, Issues 3-4; Dec. 2004, pp. 183-213.*

Schwarz, R., Ptak, T., Holder, T., Teutsch, G., 1998. Groundwater risk assessment at contaminated sites: a new investigation approach. In: Herbert, M., Kovar, K. (Eds.), GQ'98 Groundwater Quality: Remediation and Protection, IAHS Publication, vol. 250, pp. 68-71.*

Imran Maqsood, Jianbing Li, Guohe Huang and Yuefei Huang "Simulation-based risk assessment of contaminated sites under remediation scenarios, planning periods, and land-use patterns-a Canadian case study" Stochastic Environmental Research and Risk Assessment, vol. 19, No. 2 (May 2005).*

Rabiei, Minou, et al. "Excess water production diagnosis in oil fields using ensemble classifiers." Computational Intelligence and Software Engineering, 2009. CiSE 2009. International Conference on. IEEE, 2009.*

Li, Hongqi, et al. "Data mining techniques for complex formation evaluation in Petroleum Exploration and Production: A Comparison of Feature Selection and Classification Methods." Computational Intelligence and Industrial Application, 2008. PACIIA'08. Pacific-Asia Workshop on. vol. 1. IEEE, 2008.*

PCT International Search Report and Written Opinion dated Jan. 19, 2010, pp. 1-5.

* cited by examiner

300

| | | | January 06 | | | | |
|---|---|---|---|---|---|---|---|
| Monday | Tuesday | Wednesda | Thursday | Friday | Saturday | Sunday | |
| | 27 | 28 | 29 | 30 | 31 | | |
| 2 | 3 | 4 | 5 | 6 | 7 | 8 | |
| 9 | 10 | 11 | 12 | 13 | 14 | 15 | |
| 16 | 17 | 18 | 19 | 20 | 21 | 22 | |
| | | 25 | 26 | 27 | 28 | 29 | |

| | | January 06 | | | | |
|---|---|---|---|---|---|---|
| Monday | Tuesday | Wednesda | Thursday | Friday | Saturday | Sunday |
| | 27 | 28 | 29 | 30 | 31 | |
| 2 | 3 | 4 | 5 | 6 | 7 | 8 |
| 9 | 10 | 11 | 12 | 13 | 14 | 15 |
| 16 | 17 | 18 | 19 | 20 | 21 | 22 |
| | | 25 | 26 | 27 | 28 | 29 |

| Active | Crew | StartTime | Duration | TaskName | Location | Conflict | |
|---|---|---|---|---|---|---|---|
| ● | Crew #12000 | 1/6/2006 8:00:00 AM | 8 | Repair pump | 03RC0228 | | Edit |
| ● | Crew #12001 | 1/6/2006 12:00:00 PM | 4 | General Maint | 03RC0218A | | Edit |
| ● | Crew #12000 | 1/7/2006 8:00:00 AM | 8 | Repair pump | 03RC0179 | | Edit |
| ● | Crew #12001 | 1/7/2006 8:00:00 AM | 8 | Start steam flooding | 03RC0218A | | Edit |
| ● | Crew #12000 | 1/10/2006 12:00:00 AM | 8 | Start steam flooding | Well 2 | | Edit |
| ● | Crew #12001 | 1/15/2006 8:00:00 AM | 4 | Other | AWT #2 | | Edit |
| ● | Crew #12001 | 1/15/2006 1:00:00 PM | 5 | Other | AWT #9 | | Edit |

Figure 3

SYSTEMS AND METHODS FOR DIAGNOSING PRODUCTION PROBLEMS IN OIL FIELD OPERATIONS

CROSS-REFERENCE TO RELATED APPLICATIONS

The present application claims priority under 35 U.S.C. §119 to U.S. Provisional Application Nos. 60/950,505 and 60/950,533 filed on Jul. 18, 2007, the entire disclosures of which are herein expressly incorporated by reference. The present application is also related to U.S. patent application Ser. 12/175,993, entitled "Systems and Methods for Managing Large Oil Field Operations", filed on even date herewith and U.S. patent application Ser. No. 12/175,769 entitled "Systems and Methods for Increasing Safety and Efficiency in Oil Field Operations", filed on even date herewith, the entire disclosures of which are herein expressly incorporated by reference.

FIELD OF THE INVENTION

The present invention relates to a method for increasing safety and efficiency in oil field operations, diagnosing production problems in oil field operations and managing large oil field operations.

BACKGROUND OF THE INVENTION

The complexity of oil field operations continues to increase with no end in sight. Each department in oil field operations (for example: production, maintenance and engineering) further increases the complexity due to the fact that each department has its own methodology and specialized tools to achieve their individual goals.

However, in order to effectively and efficiently manage overall oil field operations, it is necessary that these different departments combine their efforts. This cooperation of different departments requires sharing and coordination of the flow of information between all department participants, which is critical to the success of a common goal. There are no integrated, ready-to-use processes to assist department managers in setting up an infrastructure to facilitate an integrated communication between different departments.

Although many different tools for analysis exist today, these tools are typically focused on solving departmental specific issues. In addition, these different tools are typically not compatible with each other so that it is difficult to share information between the different tools. Thus, an operations manager may find it difficult to visualize the whole picture since there is no single tool for viewing the information generated by all of the various tools.

Communication and collaboration between departments is still typically performed as it has always been, i.e., either by getting together in person around a whiteboard or by traditional means of communication such as telephones. As a result, department managers spend a lot of their working time in meetings or on the phone exchanging information, such as scheduling information and the like. In general, the time spent on collaboration increases directly with the complexity of the work that needs to be done. The problem with typical collaboration methods is that they tend to be error-prone, inefficient, temporary, expensive and very risky. Some critical areas that are affected by the problematic ad-hoc collaboration are as follows:

The first critical area of concern is safety. Perhaps the most dangerous situation a company can face in the producing field is one where simultaneous operations are involved, especially where drilling, production, and construction crews are all working on the same site.

The second critical area is in re-developing inactive petroleum field/wells. Return to production (RTP) and well workover activities must be maintained on schedule to prevent slowing production start-up. Specific examples of manual independent non-integrated processes for scheduling include: facility maintenance work, cyclic steam, service rig, workover rig, drilling, new construction, and survey. If maintenance work is being performed on a certain piece of equipment without all affected departments being advised, serious safety issues could arise in the field for work crews having incorrect information. This obviously can lead to disastrous consequences.

Scheduling and executing these well and facility operations safely and optimally makes all work visible to everyone, eliminates time consuming creation and updating of multiple manual schedules, and eliminates the time required for making and maintaining a schedule and refocus that effort towards better execution.

Thus it is desirable to overcome the above mentioned problems and to provide a method for increasing safety and efficiency in managing oil field operations and diagnosing production problems in an oil field.

SUMMARY OF THE INVENTION

Systems and methods for diagnosing production problems in oil field operations are provided. A first video monitor displays an oil field diagnosis process flow chart in a master schedule visualizer system, wherein each object in the flow chart is a selectable object and where the selectable objects comprise Review Well Test Differences, Review Sliders, Review Bad Actors, and Perform Steam Flood Performance Check, wherein each selectable object is associated with one or more incompatible domain-specific software applications. One or more of the selectable objects are selected in series in the oil field diagnosis process flow chart, and upon selection one or more additional video monitors display one or more reports extracted by a middle-ware software code segment layer from the associated domain-specific software applications. Any oil wells having production problems are listed, any problem oil wells are displayed on an oil field map via a geographic information system. Any commonalities among the displayed problem oil wells are visually identified, wherein such commonalities are indicative of a common cause of the production problems. Work is scheduled in the associated domain-specific software applications sufficient to remedy the common cause.

The oil field map comprises oil well objects, oil field facility objects, surface work crew objects, sub-surface work crew objects, equipment rigs objects and safety zones objects. The oil field map is customizable by date, has a date selector tool, and wherein each of the oil well objects, oil field facility objects, surface work crew objects, sub-surface work crew objects, equipment rigs objects and safety zones objects comprise a date attribute and a location attribute. Each of the work crew objects is coded by a visual indicator to indicate a type of work. User selection of a work crew object causes a text box to display having a description of the work associated with the work the crew object. A safety zone object is associated with a work crew object and has a radius attribute extending 360 degrees around the center of the work crew object for the distance set by the radius attribute.

The surface work crew objects represent surface work crews comprising facility maintenance work crews and cyclic steam work crews. The sub-surface work crew objects represent sub-surface work crews comprising service rig work crews, workover rig work crews, drilling work crews and well-logging work crews. The domain-specific software applications from which surface work crew objects are extracted comprise applications for facility maintenance, reservoir analysis, production analysis and construction management. The domain-specific software applications from which sub-surface work crew objects are extracted comprise applications for reservoir analysis, production analysis, well-logging analysis and crew and equipment management. The surface and sub-surface work crew objects are coded by a visual indicator selected from shape, color, text labeling, or mixtures thereof.

The safety zone objects comprise no electromagnetic signal emission zones, no drilling zones, no cyclic steaming zones, no production zones, no hot-work zones and environmentally sensitive zones The scheduling of work involves utilizing a scheduling conflict engine to read the attributes of any adjacent oil well objects, oil field facility objects, surface work crew objects, sub-surface work crew objects, equipment rigs objects and safety zone objects, and returning a conflicts indicator if any conflicts exists.

A scheduling conflict resolution engine can be utilized to receive any conflict indicators, communicate with any domain-specific software application from which a conflicted work crew object was extracted, and return a revised, conflict-free work schedule.

The oil field can be a new oil field or a producing oil field.

The map and objects are generated by a master schedule visualizer system. The system includes the plurality of incompatible software applications, each having a different domain-specific functionality useful for oil field management and having a work crew scheduling code segment, each in communication with a dedicated database, each software application loaded into memory of a general purpose personal computer or general purpose server class computer. The system also includes a middle-ware software code segment layer in communication with each of the domain-specific software applications for extracting work schedule data from each of the domain-specific software applications. The system further includes a geographic information system in communication with the middle-ware software code segment layer for displaying an oil field map, oil well objects, oil field facility objects, surface and sub-surface work crew objects, and safety zones objects. The system also includes a plurality of input devices operatively connected with the middle-ware software code segment layer for allowing a plurality of users to input instructions to the middle-ware software code segment layer and communicate with the software applications. The first and one or more video monitors are operatively connected with the middle-ware software code segment layer and the geographic information system, for displaying the oil field map, oil well objects, oil field facility objects, surface and sub-surface work crew objects, and safety zones objects, and reports from the domain-specific software applications.

BRIEF DESCRIPTION OF THE DRAWINGS

FIG. 3 is a schematic diagram depicting in one embodiment an exemplary view of a master schedule aspect of the invention.

DETAILED DESCRIPTION OF PREFERRED EMBODIMENTS OF THE INVENTION

So that the above recited features and advantages of the present invention can be understood in detail, a more particular description of the invention, briefly summarized above, may be had by reference to the embodiments thereof that are illustrated in the appended drawings. It is to be noted, however, that the appended drawings illustrate only typical embodiments of this invention and are therefore not to be considered limiting of its scope, for the invention may admit to other equally effective embodiments.

Embodiments describing the components and method of the present invention are referenced in FIGS. 1 to 8. More specifically, the following embodiments describe the architecture, workspaces and example use cases of a master schedule visualizer 100, for implementing the present invention.

A. System Architecture and Elements of One Embodiment

Figure 1A:
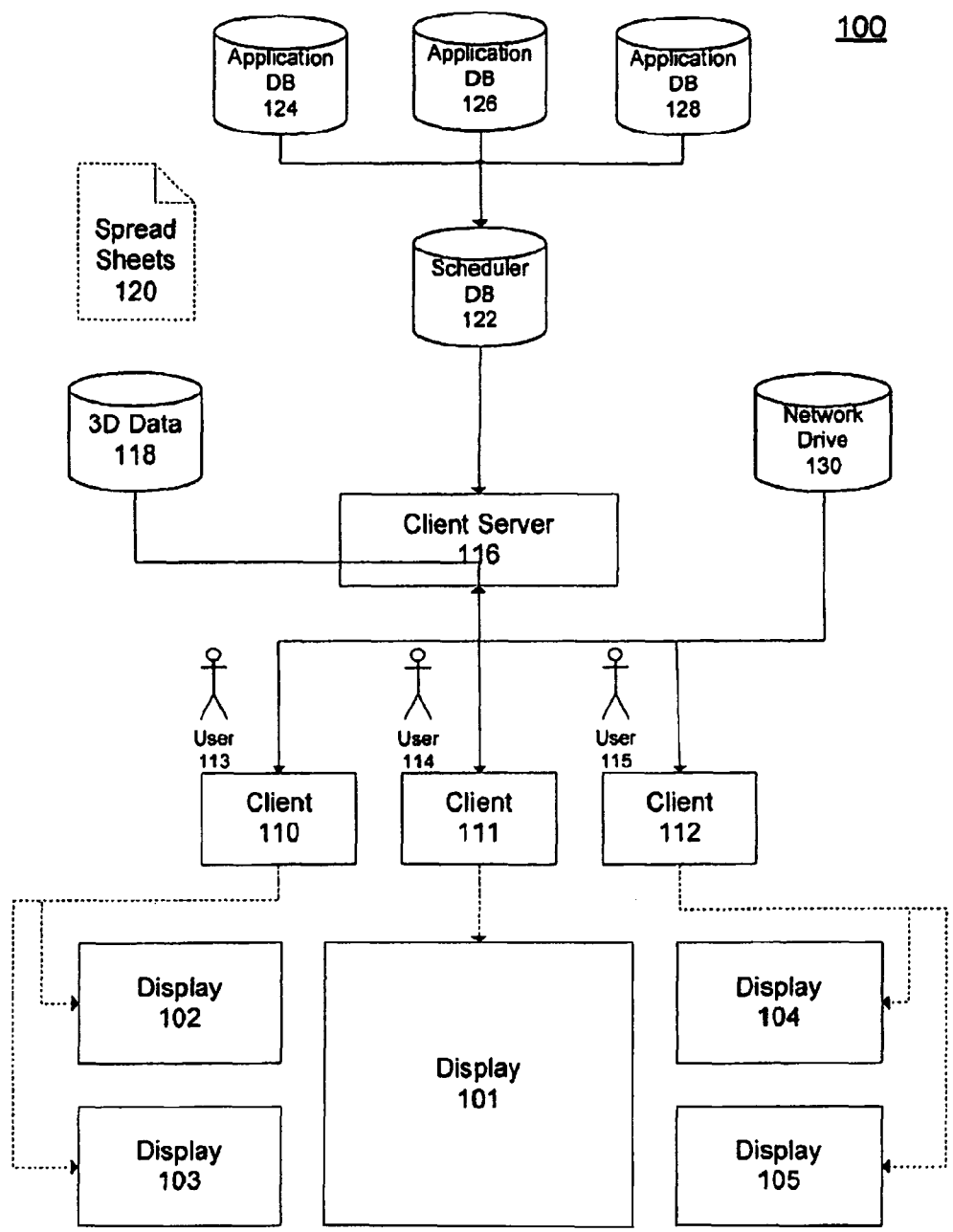
FIG. 1A is a schematic diagram depicting the system architecture of the master schedule visualizer in accordance with one embodiment of the invention.

FIG. 1 is a schematic diagram depicting in one embodiment the system architecture of the master schedule visualizer of the invention. As shown in FIG. 1, the master schedule visualizer 100 includes displays 101-105, one or more client servers 116, (e.g., Epsis™ Real-Time Assistant (ERA)), clients, (e.g., ERA clients, domain-specific applications) 110-$n$ (only 110-112 shown), a 3D-data database 122, spreadsheets 120, a scheduler database 122, domain-specific application databases 124-$n$ (only databases 124-128 shown) and a network drive 130. The domain-specific application databases 124-128 are accessed via scheduler database 122, client server 116 and clients 110-112. Clients 110-112 can also access the 3D-data database 122 via client server 116 and can directly access the network drive 130 and spreadsheets 120. Clients 110-112 communicate with the displays 101-105 so that information may be visualized by users 113-$n$ (only users 113-115 shown). Each component of the master schedule visualizer 100 is described below in more detail. The numbers are for illustration only, i.e., the invention can include more or less than the number of displays, clients, servers, and databases shown in FIG. 1.

The master schedule visualizer 100 components interact as follows. Domain-specific client applications 110-112 retrieve and process data from their respective application databases 124-128 to produce a work schedule. Client server 116 retrieves data of the oil field (which can be a new or producing oil field) and its components from the 3D-data database 122 and forms a map of the field and its components for display on one or more of displays 101-105. The work schedule includes identification of work crews, and the I.D. of the well, surface facility or other field asset being worked upon. The assets include location data and safety-zone data. The schedules are processed through scheduler database 122 to form a consolidated schedule. Client server 116 retrieves and processes the consolidated schedule to produce work crew objects (including surface and sub-surface work crew objects) and safety zone objects for overlaying display on the field map one or more of displays 101-105. The surface work crew objects can represent surface work crews comprising facility maintenance work crews, cyclic steam works crews, new construction work crews and/or the like. Sub-surface work crew objects represent subsurface work crews comprising service rig work crews, workover rig work crews, drilling work crews, well-logging work crews and/or the like.

One or more of the work crew objects can include an associated work equipment rig object that has a geographic locator device for tracking its location. The work equipment rig object can be, for example, a physical mechanical object, such as a moveable vehicle (e.g., a truck) or a rig (i.e., moveable equipment on trailer). The geographic locator device can be, for example, a global positioning satellite (GPS) device that need not necessarily include a display, can be installed under a dashboard, and includes a transmitter (e.g., a satellite, WiFi and/or cellular transmitter) to transmit the device identification and location information to a central receiving center. This information can then be presented on a display, such as master visualizer 200 of FIG. 2, described in more detail below. The safety zone objects can comprise no electromagnetic signal emission zones, no drilling zones, no cyclic steaming zones, no production zones, non hot-work zones, environmentally-sensitive zones and/or the like.

At this point users 113-115 can visualize the field, work crews, work equipment rigs and safety zones one or more of displays 110-105 for a selected date. From this the users 113-115 can visually identify work crew conflicts and/or safety zone conflicts. If any conflicts are identified one or more of users 113-115 can operate domain specific application client 101-112 to revise one or more of the scheduled work crews. The revised schedules are again consolidated and displayed. This process continues until all conflicts are removed.

1. Displays 101-105

Displays 101-n (only 101-105 shown) refer to the screen system used in the present invention. As a preferable example, the system includes one central screen (display 101) surrounded by 4 screens (displays 102 to 105) which can be any type of known or future developed display screens, e.g., plasma, LCD, or cathode tube. The central screen is preferably larger than the others and is projected onto by a high resolution projector (e.g., SXGA+1400×1500). The screens preferably are plasma screens and are preferably 50 inch HD screens. In another example, displays 101-105 include a central 32 inch LCD monitor surrounded by four 19 inch standard PC LCD displays. Displays 101-n (only 101-105 shown) are operably connected to domain-specific application clients 110-n (only 110-112 shown) and/or client server 116.

2. Clients 110-112

Clients 110-n (only 110-112 shown) refer to domain-specific software applications installed on any known or future developed platform, e.g., PCs, workstations, main frames, or web applications where the client applications are running and utilized by users 113-115. As a preferable example, there are 3 clients. The clients and associated platforms are operably connected to one or more of displays 101-105, preferably to displays 102-105. Any output of each client application is preferable displayed on one screen. In addition to the client applications, the client platforms optionally include, e.g., D7i™ of Info Inc. (a computerized maintenance management system software application), LOWIS™ of eProduction Solutions Inc. (a Production engineering software application) and DSS™ of Geographics Inc. (a Production Well graphics software application, Catalyst™ of SAE (a Petroleum Engineering software application). Each client is operably connected to one or more associated application databases 124-128 and client server 116.

3. Client Server(s) 116

Client server 116 is a server application installed on any known or future developed platform, e.g., PCs, workstations, main frames, or web applications. The server is operably connected to clients 110-n, scheduler database 122, and 3D-data database 122. Typically the connection is via a network which may be any known or future developed network type, e.g., an Ethernet local area network or the Internet or other TCP/IP based network. The server application is configured and adapted to receive 2-D or 3-D data and map from the 3D-data database 122 and display it on one of more of displays 101-n. It is also configured and adapted to receive work schedule information from scheduler database 122 and output the information on one or more of displays 101-n, and to receive data or applications from application databases 124-n and from associated respective domain-specific software application client 110-n to display a data/applications or both on one of more of displays 101-n. It is also adapted and configured to generate and display the work process guides (FIGS. 4-8) on one or more of displays 101-n, to receive an input from a user selection of an object/step in the work process guides and to display pre-determined domain-specific applications 124-n or data on one or more displays 101-n as a user progresses through the steps of the work process guides.

4. 3D-Data Database 122

The 3D-data database 122, or geographic information system file system, is a database containing all static 2D or 3D-data used by the master schedule visualizer 100 including, e.g., a terrain model, an air photo, icons for wells objects, facilities objects and crews objects. Because the amount of data to be accessed and transferred is typically large, one copy of the database is installed locally with the master schedule visualizer 100. However, all forms of databases and database access architectures are within the scope of the invention, e.g., remote databases or distributed databases. The 3D-data database 122 is accessed by the server 116 for processing the data into an image of the oil field and its associated objects for presentation to the Users 110-n on display 101.

5. Spreadsheets 120

Spreadsheets 120 are an optional way to manually update the 3D-data database 122. The spreadsheets 120 are used by a data loader person each time there is a need to add a new well, facility or crew to the 3D map. The 3D-data database 122 preferably is regularly updated at each location. Spreadsheets 120 can be created in Excel™ by Microsoft Inc. or any other spreadsheet program. Other means of updating the 3D-data database 122 are within the skill of the ordinary skilled person in the field and are within the scope of the invention.

6. Scheduler Database 122

Scheduler database 122 is any known or future developed database, preferably, e.g., an SQL database, containing crew schedules. Data from scheduler database 122 is passed to client server 116 which provides a visual presentation and passes it to clients 110-112.

7. Application Databases 124-128

The application databases 124-$n$ (only 124-128 shown) are databases in any known and compatible database standard, suitable for use with the associated respective domain-specific software application client 110-$n$. These include, e.g., $3^{rd}$ party databases for use with LOWIS™, D7i™ and DSS™. An automatic procedure is used for synchronizing scheduler database 122 with the application databases 124-128. The respective domain-specific client applications 110-112 are also operably connected to the application databases for read-write operations.

8. Network Drive 130

The network drive 130 is a shared disk drive accessible from clients 110-112. It is used for storing non-structured data records.

B. System Architecture and Elements of Another Embodiment

Figure 1B:
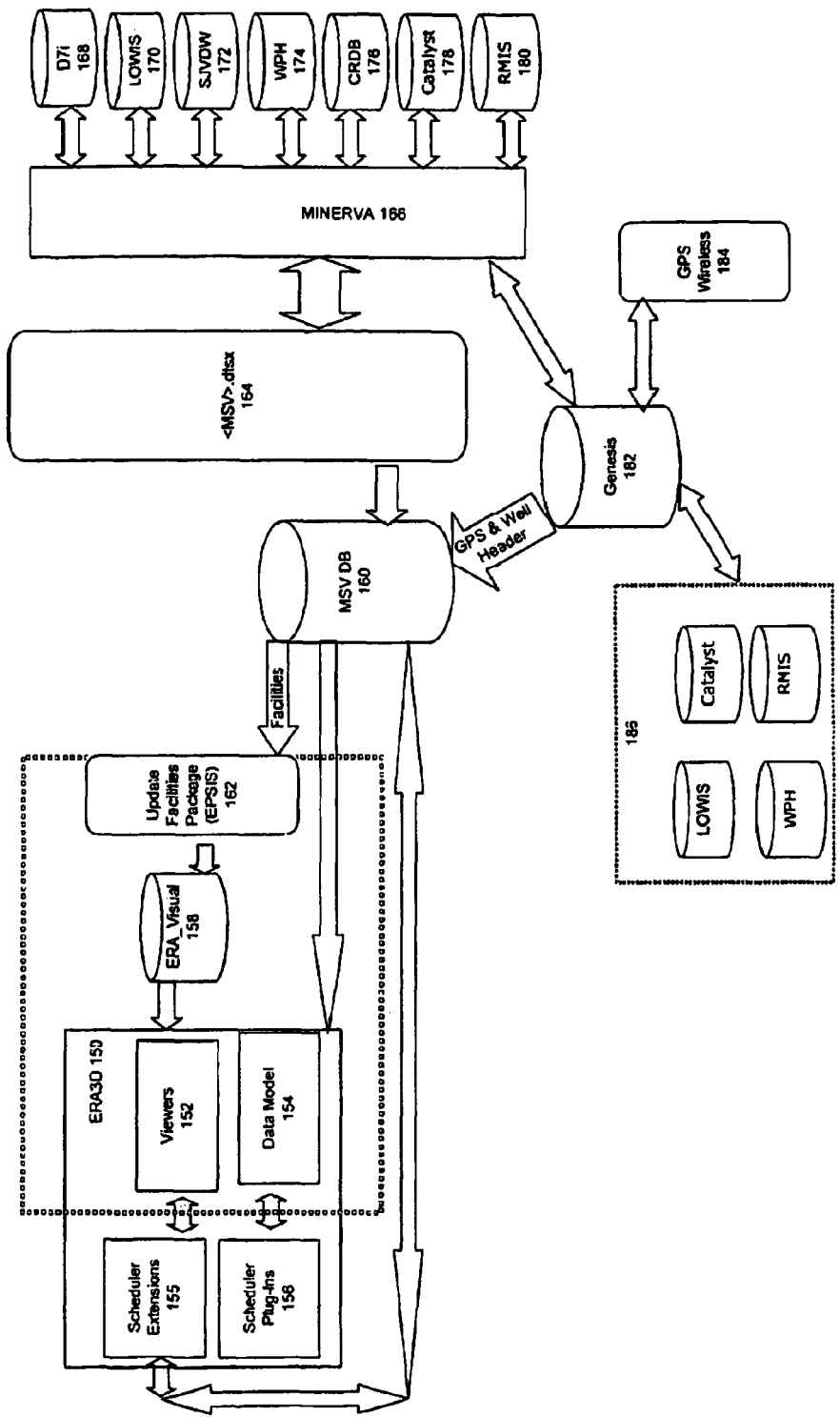
FIG. 1B is a schematic diagram depicting the system architecture of the master schedule visualizer in accordance with another embodiment of the invention.

The system of FIG. 1B includes an ERA client server 150 coupled to an ERA_Visual database 158 and a MSV database 160. The dashed box in FIG. 1B represents the ERA Visual application. ERA database 158 is coupled to update facilities package element (EPSIS) 162, which is coupled to MSV database 160 in order to receive facilities information. MSV database 160 is coupled to MSV .dtsx 164 and Genesis 182. Genesis 182, which is a SQL database that pulls GPS data from GPS wireless element 184 and databases 186, and provides the GPS and well header data to MSV database 160. GPS wireless 184 is a web service that pulls GPS data from GPS devices installed in vehicles and rigs.

MSV .dtsx 164 is coupled to MINERVA 166. MINVERA 166 is coupled to databases 168-180, which include a D7i database 168, a LOWIS database 170, a database with data for a particular location 172 (which in this example is a San Joaquin Valley Data Warehouse (SJVDW)), well production history (WPH) database 174, Minerva common reference (CR) database 176, Catalyst database 178 and Reservoir Management Information System (RMIS) database 180.

ERA client server 150 is a 3D client server, which includes viewers 152, data model 154, both of which are coupled to scheduler plug-ins 156 and scheduler extensions 155. Scheduler extensions 155 are additional plug-ins/tools that are used by the MSV to provide a way for power users to easily add, modify, delete and view user created data, such as tags for facilities. Extensions 155 talk directly with MSV database 160, and data flows both ways between these elements. In this embodiment, ERA client server 150, based on viewers 152, data model 154 and scheduler plug-ins 156, requests information from databases 158, 160 and 168-180, as well as DIS 162, in order to display a schedule. When data is required from databases 168-180, MSV .dtsx 164 obtains the information via MINERVA 166. Viewers 152 are a 3-D engine used within the MSV system that displays map and other data. Data model 154 is a data set returned to the system from MSV database 160. This data set is then displayed in the MSV. Scheduler plug-ins 156 are tools that plug into the MSV to perform various functions, such as filtering data, and make up a large part of the user interface. Update facilities package (EPSIS) 162 is a SQL server SSIS package that updates the data in ERA_Visual 158. Element 162 essentially takes new data from MSV database 160 and pushes it into views 152.

C. Workspace Descriptions

1. Overview

Included in the invention is a method of increasing efficiency and safety in managing an oil field, diagnosing production problems in an oil field, and managing large oil field operations. In a preferred embodiment these methods utilize the master schedule visualizer system 100 (FIG. 1). Displays 101-$n$ (only 101-105 shown) are utilized to display different information for use in the method. FIGS. 2-8 each depict in preferred embodiment, the use of displays 110-112. The text, images, or other objects, preferably user interactive, displayed to users 113-$n$, on displays 110-$n$, are referenced in this specification and the appended claims as "workspaces."

Figure 5:
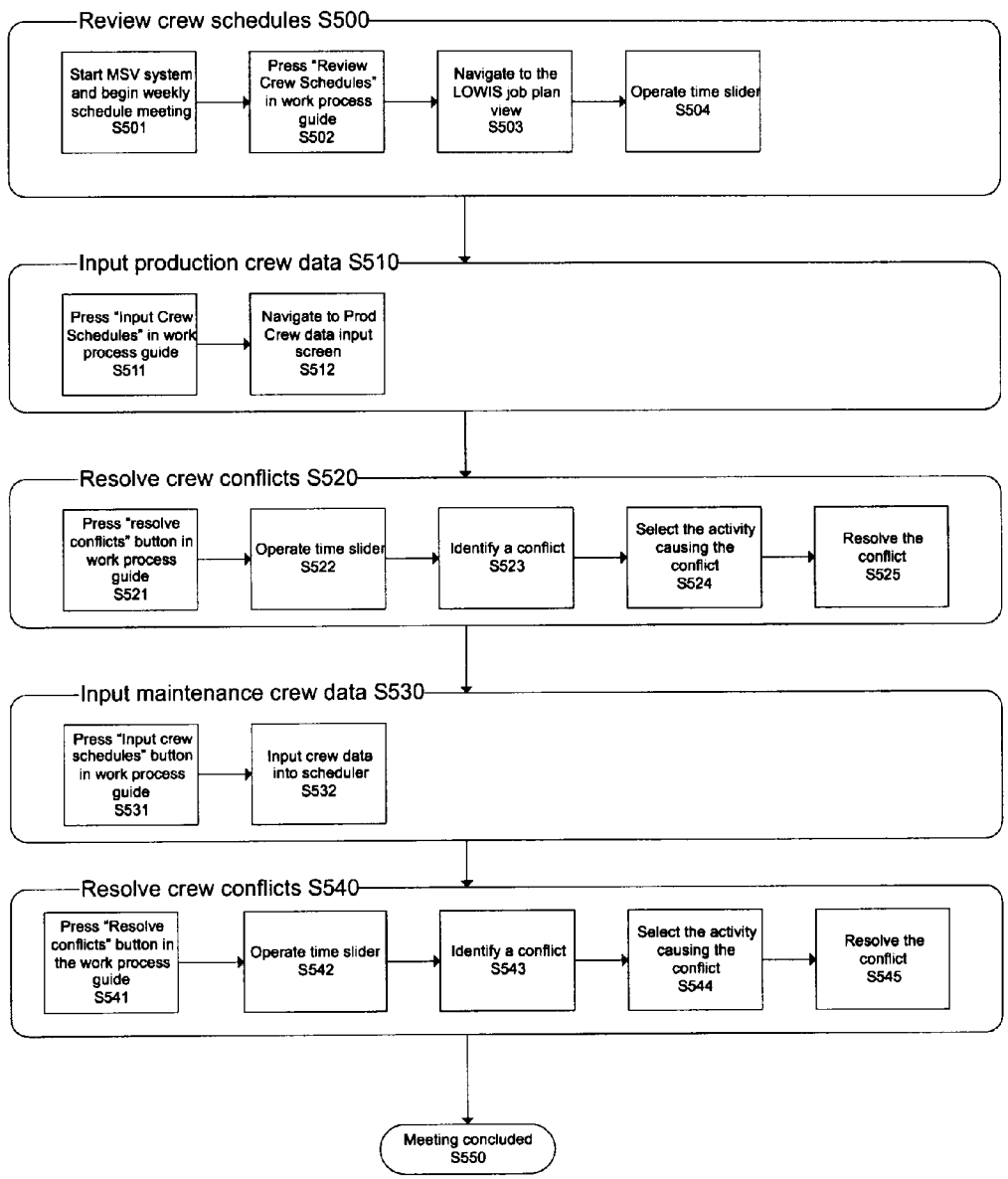
FIG. 5-6 are schematic level 1 process flow diagrams depicting in particular embodiments a first level decomposition of the process flow blocks in FIGS. 4A-4B.
Figure 6:
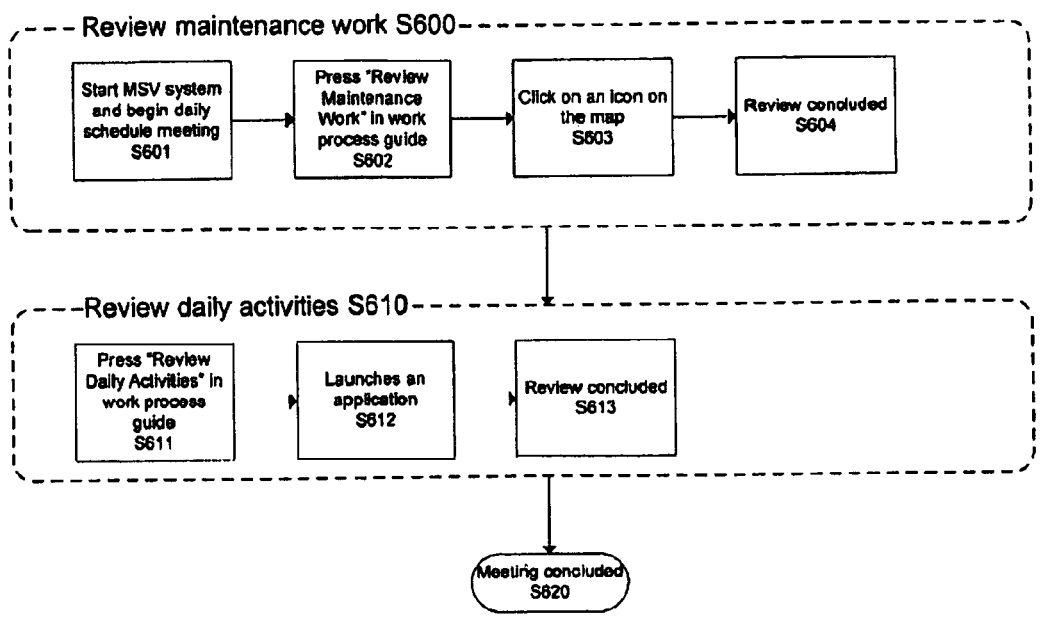
Figure 7:
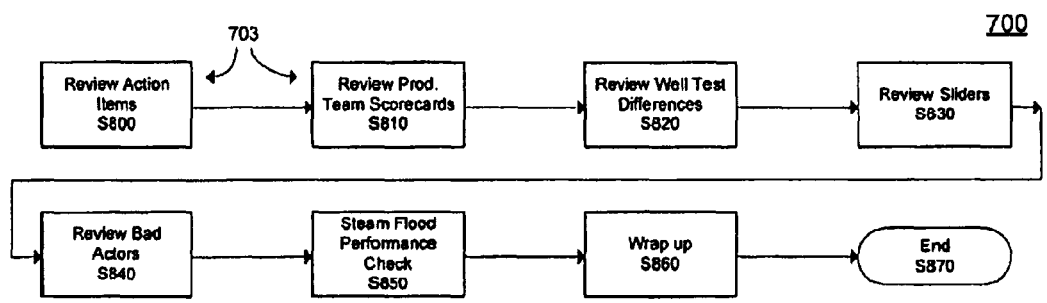
FIG. 7 is a schematic level 0 process flow diagram depicting in particular embodiments the work process guide aspects of the invention.
Figure 8:
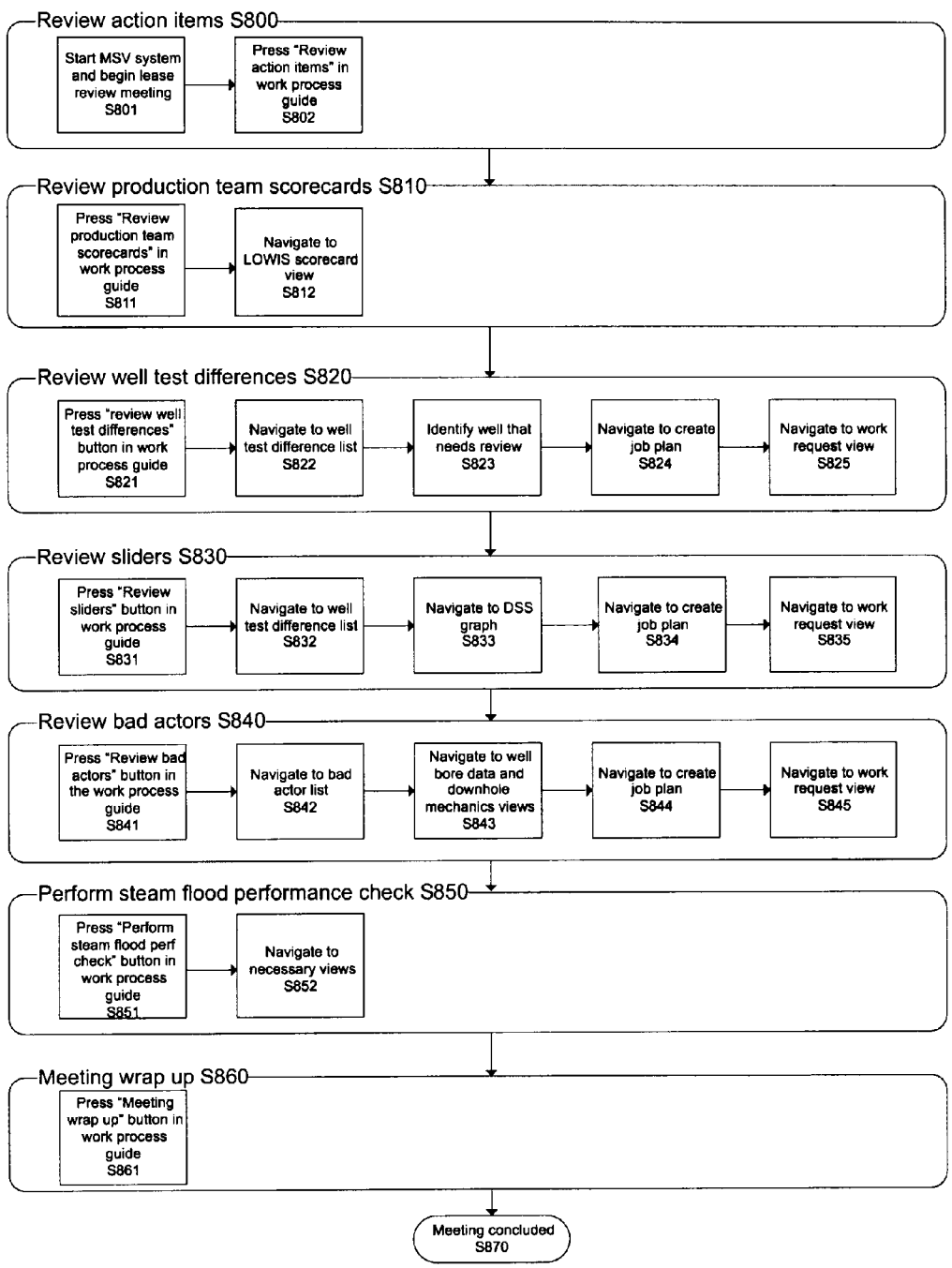
FIG. 8 is a schematic level 1 process flow diagram depicting in particular embodiments a first level decomposition of the process flow blocks in FIG. 7.

The illustrative workspaces shown in FIGS. 2-8 are the master visualizer workspace 200 (FIG. 2) ("MV"), masterwork scheduler 300 (FIG. 3) work process guides 401 and 402 (FIGS. 4A and 4B and FIG. 5) and work process guide 700 (FIGS. 7 and 8). Each illustrative workspace (or display) of the master schedule visualizer 100 is described below in more detail.

2. Master Visualizer

Figure 2:
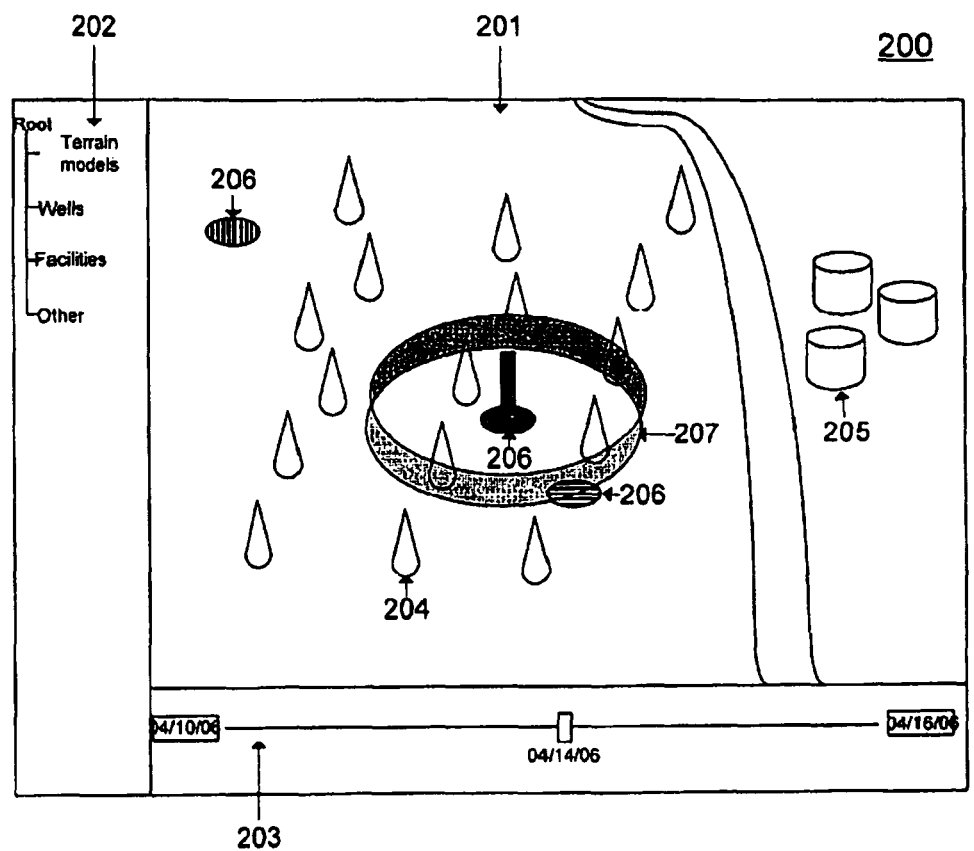
FIG. 2 is a schematic diagram depicting in one embodiment an exemplary view of the display aspect of the invention depicting on oil field with wells, safety zones, and facilities.

FIG. 2 is a schematic diagram depicting in one embodiment an exemplary view of the display aspect of the invention. The master visualizer workspace 200 is the central display 101 of the master schedule visualizer 100. This workspace is preferably displayed on the largest of displays 101-$n$. The master visualizer workspace 200 has a 2D or 3D map over a 2D or 3D depicted oil field including relevant objects of interest. Objects of interest are represented by icons of different shape and color, and include wells 204, facilities 205, work crews 206, and safety zones 207. The icons are preferably click-sensitive and preferably have context menus. A 2D or 3D viewer 201 of the master visualizer 200 preferably has a hovering feature which displays key information about objects in the map when a user mouses over the object.

The master visualizer 200 preferably includes a data tree 202, which is a data structure for storing/organizing all data that can be displayed in the 2D or 3D viewer 201. The data is preferably organized in groups. The user preferably can select whole groups or single data objects for display. Preferably at the bottom of the master visualizer 200 is a slide bar 203 where the user 113-115 can step through days within a planning period. When scrolling through time using the slide bar 203, the crew icons will preferably move around on the 2D or 3D map depending on their schedules. If there are conflicts in the schedules, either of a resource or safety character, preferably these will be highlighted in the 2D or 3D map.

3. Schedule

FIG. 3 is a schematic diagram depicting in one embodiment an exemplary view of a master schedule aspect of the invention. The schedule workspace 300 shows different types of reports with scheduled activities associated with a well, facility or crew. Schedule workspace 300 includes columns for indicating whether a crew is active, the crew identification, the start day and time for the crew, duration of the crew's task, name of the crew's task, crew's work location and an identification of any conflicts. Schedule workspace 300 also includes an Edit link, which allows any of the aforementioned data to be edited. A user can also click on any of the days in the calendar of schedule workspace 300 in order to see the scheduled activities for that particular day and other proximate days.

4. Work Process Guide

Figure 4A:
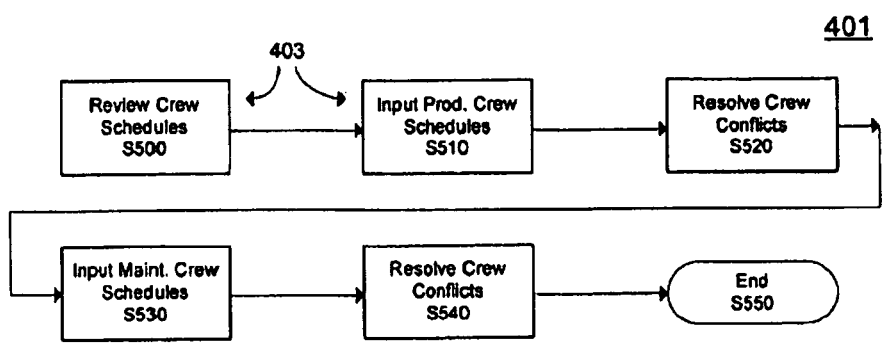
FIGS. 4A-4B are schematic level 0 process flow diagrams depicting in particular embodiments the work process guide aspects of the invention.
Figure 4B:

FIGS. 4A-4B are schematic level 0 process flow diagrams depicting in particular embodiments the work process guide aspects of the invention. The work process guide workspaces 401 and 402 are graphical representations of a work process allowing for intuitive navigation through the different steps in the work process. Each step is represented by a preferably click sensitive box 403. Upon a mouse click or mouse over on any one of the boxes 403, an action takes place, e.g., updating or changing the content on the displays 101-105. The work process guide 401 and 402 provides a structured management of the meeting or process and also secures that all the relevant information are available on displays 101-105 through each step in the process. Illustrative work processes are discussed in further detail in the Illustrated Embodiments of Use Cases of the System section below.

5. Other

Any of the Displays 101-n can also be used to launch and interact with any domain-specific software applications such as the application databases 124-128.

D. Illustrated Embodiments of Use Cases of the System

When the master schedule visualizer 100 is started, users 113-115 will select which work process to carry out. One work process is to review work crews 206 (FIG. 2) scheduled for different days or other time periods, determine if any conflicts of work crews 206 or safety zones 207 exist, and, if so, revise the work crew schedules until all conflicts are removed. Since the work crew schedules are typically generated in domain-specific software applications executed on clients 110-112 (FIG. 1), the schedule revision will typically require a user 113-115 to open and interact with one or more of the domain-specific software applications which generated the work crew schedules 206 or safety zones 207 in conflict. As discussed above, work crew objects can be surface and sub-surface work crew objects. The domain-specific applications for surface work crew objects comprise applications for facility maintenance, reservoir analysis, production analysis, construction management and/or the like. The domain-specific applications for sub-surface work crew objects comprise applications for reservoir analysis, production analysis, well-logging analysis, crew and equipment management and/or the like.

Such opening and interacting with domain-specific software applications will utilize one or more of displays 101-n, preferably one of peripheral or smaller displays 102-105 adjacent to the main larger display 101 having the 2D or 3D map of the oil field and associated objects. The users cause the work crew schedules to change and this new work crew schedule is passed through scheduler database 122 and client server 116 for consolidation and display as an updated schedule on display 101. The users can view the display to verify that the conflict is removed. This process repeats until all conflicts are removed.

In a preferred embodiment such work processes for removing conflicts are guided. Work processes 401 and 402 in FIGS. 4A-B show exemplary guided work process for removing scheduling conflicts. The work process is displayed on one of displays 101-105, preferably a peripheral display 102-105. By clicking on each of the boxes 403 in the diagram, the relevant information for that particular step in the process will be displayed on the other displays 101-105. This information will be either a workspace or a domain-specific software application. In this way, the work process guide 401 and 402 will guide users 113-115 through the process and make sure that the relevant information is available at the right place at the right time.

1. Weekly Schedule Planning Meeting

FIG. 4A is a schematic level 0 process flow diagram depicting in a preferred embodiment a weekly schedule-planning meeting guided work process 401. In step S500, crew schedules are reviewed. In step S510, production crew data is input to master schedule visualizer 100. In step S520, crew conflicts are resolved. In step S530, maintenance crew data is input to master schedule visualizer 100. In step S540, crew conflicts are resolved. In step S550, the schedule planning meeting is concluded. While shown as forward flowing process, there are loops, as needed, to review all work crew schedules and remove all conflicts.

FIG. 5 is a schematic level 1 process flow diagram depicting in particular embodiments a first level decomposition of weekly schedule planning meeting guided work process 401 in FIG. 4A. The purpose of this meeting is to coordinate the production and maintenance work schedules for the following week and enter the activities and jobs into the appropriate domain-specific software application being executed on clients 110-112 (FIG. 1), e.g., LOWIS™ and D7i™. The results of a problem-solving session using the master schedule visualizer 100, (also called a lease review, meeting and information on wells with active trouble/shut downs (e.g., via LOWIS™, DSS™, verbal reports)) are preferably used as inputs.

To avoid conflicts and potential safety issues, this schedule must take into account all the ongoing activities in the oil field, including construction, drilling, HES, electrical and abandonment groups working in the field. Thus, a streamlined and efficient weekly planning process 401 for the oil field uses the master schedule visualizer 100 to integrate and display the necessary data in an organized and efficient manner, as well as allow the user to schedule jobs in the appropriate application. The weekly schedule planning meeting 400 includes a process for increasing safety and efficiency in oil field operations as described below.

Firstly, by utilizing the master visualizer workspace 200 (FIG. 2), a map of an oil field (new or producing oil field) is displayed on a monitor such as the display 101. The map includes oil well objects 204, oil field facility objects 205, work crew objects 206, and safety zone objects 207. The map is also customizable by date and has a date selector tool such as the slide bar 203. Each of the oil well objects 204, oil field facility objects 205, work crew objects 206, and safety zones objects 207 include a date attribute and a location attribute.

The work crew objects 206 are coded by a visual indicator (for example, by shape, color, text labeling, or mixtures thereof), to indicate the type of work that is being performed. The type of work crews include facility maintenance work crews, cyclic steam work crews, service rig work crews, workover rig work crews, drilling work crews, and well-logging work crews. If the work crew object 206 is selected by a user, a text box having a description of the work associated with the work crew object 206 is displayed.

The safety zone object 207 is also associated with the work crew object 206 and has a radius attribute extending 360 degrees around the center of the work crew object 206 for the distance set by the radius attribute. The safety zone objects 207 include, e.g., no electromagnetic signal emission zones, no drilling zones, no cyclic steaming zones, and no production zones. Although not illustrated, the safety zone object 207 can be associated with an oil well object and/or an oil field facility object.

Next, scheduling conflicts are identified. Conflicts occur when two or more incompatible work crew objects 206 are at a single or overlapping location on the oil field map, or when the incompatible first work crew 206 is within the safety zone object 207 associated with the second work crew object 206. A scheduling conflict engine or identifying means (for example, scheduler database 122) reads the attributes of any adjacent objects and in a preferred embodiment returns a conflicts indicator if any conflicts exists. Alternatively, a conflict is determined by users 113-115 by way of visual reading of any adjacent work crews 206 and safety zones 207.

Finally, in order to resolve conflicts, at least one work crew object 206 is rescheduled via a domain-specific software application from which the work crew object 206 was extracted. The domain-specific software applications include the $3^{rd}$-party applications for facility maintenance (e.g., D7i™) and reservoir analysis (e.g., Dynamic Surveillance System (DSS), Heat Management Tools, Chears™ and/or the like), which are hosted on the application databases 124-128.

A scheduling conflict resolution engine or rescheduling means (for example, scheduler database 122) is also provided for receiving any conflict indicators, communicating with any domain-specific software application from which the conflicted work crew object 206 is extracted, and returning a revised, conflict-free schedule. The process of identifying and resolving conflicts is repeated until all conflicts are removed for a date range of interest.

The above-mentioned maps and objects are generated by the master schedule visualizer 100 which includes a plurality of incompatible software applications (e.g., any of the aforementioned $3^{rd}$ party applications), each having a different domain-specific functionality useful for oil field management and having a work crew scheduling code segment, each in communication with a dedicated database (i.e. application databases 124-128), each software application loaded into memory of a general purpose personal computer or general purpose server class computer (client server 116); a middle-ware software code segment layer (the schedule 300) in communication with each of the software applications for extracting work schedule data from each of the software applications; a geographic information system (the 3D-data database 122) in communication with the middle-ware software code segment layer for displaying an oil field map, the oil well objects 204, the oil field facility objects 205, the work crew objects 206, and the safety zones objects 207; a plurality of video monitors (displays 101-105) operatively connected with the middle-ware software code segment layer and the geographic information system, for displaying the oil field map, the oil well objects 204, the oil field facility objects 205, the work crew objects 206, and the safety zones objects 207, reports from the software applications; and a plurality of input devices (i.e., clients 110-112) operatively connected with the middle-ware software code segment layer for allowing a plurality of users (i.e., users 113-115) to input instructions to the middle-ware software code segment layer and communicate with the software applications.

The production and maintenance crew schedule is coordinated with the following schedules (constraints):

1. Construction: general data is stored in D7i with construction and schedule details stored in MS Project. Construction efforts include several crews and pieces of equipment throughout the fields coordinated by Engineers and Construction Foremen.
2. WEO (Work-Overs): project and schedule data is stored in LOWIS. WEO include several rigs, crews and trucks throughout the fields coordinated by Reliability Representatives.
3: Drilling: project and schedule data is stored in an Excel DB. Drilling activities include several rigs, crews and trucks throughout the fields coordinated by the Drilling Team.
4. Abandonment: project and schedule data is stored in an Excel DB. Abandonment activities include several rigs, crews and trucks throughout the fields coordinated by the Abandonment Team.
5. HES (Health, Environment and Safety): HES Representatives monitor field conditions and field activities to ensure activities are performed safely while also protecting the environment.

The people attending this meeting would be, e.g., from maintenance and production departments. Optional attendees include the Health, Environment and Safety (HES) department and the construction department.

Referring to FIG. 5, in step S500, crew schedules are reviewed. In substep S501, the master schedule visualizer 100, displays 101-105 and clients 110-112 are started. The display 102 displays the workspace work process guide 401. All other displays show a generic image. The work process guide 401 has the following items:

1. Review crew schedules
2. Input Production crew schedule
3. Resolve conflicts
4. Input Maintenance crew schedule.
5. Resolve conflicts The purpose of this meeting is to coordinate all field personnel activities.

In substep S502, the user presses the "Review Crew Schedules" button in the work process guide 401. Next, in substep S503, the user navigates to the LOWIS™ job plan view and selects the appropriate crew schedule views. The following workspaces are shown:

Display 101: MV 200
Display 102: WPG 401
Display 103: LOWIS™ Job Plan view
Display 104: Schedule 300
Display 105: Schedule 300

A view containing the queue of jobs available for the production crew is displayed. The queue is generated by the operators, Artificial Lift Specialist (ALS), Production Technician (PT) and production engineer, who enter job plans into LOWIS™. The users can sort by approver, Discounted Profitability Index (DPI), etc. The economics are reviewed and the jobs approved by the ALS. The purpose of this step is to review the other crew's schedules to provide framework for putting together the production and maintenance crew schedules for the planning period.

In substep S503, the user navigates to the LOWIS job plan view, and in substep S504, the user operates the time slide bar 203 on the master visualizer 200 to scroll through the days of the planning period. The following workspaces are shown:

Display 101: MV 200
Display 102: WPG 401
Display 103: LOWIS™ Job Plan view
Display 104: Schedule 300
Display 105: Schedule 300

The position of the crews changes in the master visualizer 200 according to the scheduled activities of the crews during the planning period.

In step S510, production crew data is input. In substep S511, the user presses the "Input Crew Schedules" button in work process guide 401. The following workspaces are shown:

Display 101: MV 200
Display 102: WPG 401
Display 103: LOWIS™
Display 104: Schedule 300
Display 105: D7i™

Next, in substep S512, the user navigates to the screen to input production crew data into LOWIS™ or D7i™ or the Schedule 300. The following workspaces are shown.

Display 101: MV 200
Display 102: WPG 401
Display 103: LOWIS™
Display 104: Schedule 300
Display 105: D7i™

After data is input into LOWIS™ and D7i™, the user refreshes scheduler database 122 to reflect the new data. In this way, a streamlined scheduling process is achieved.

In step S520, crew conflicts are resolved. In substep S521, the user presses the "Resolve conflicts" button in the WPG 401. The following workspaces are shown:

Display 101: MV 200
Display 102: WPG 401
Display 103: Schedule 300
Display 104: Schedule 300
Display 105: Schedule 300

Each Schedule 300 workspace shows the information for a different crew. The user can select which of the seven crews they want to view: maintenance, production, construction, drilling, WEO, abandonment or HES.

In substep S522, the user operates the time slide bar 203 on the master visualizer 200 to scroll through the days of the planning period. The following workspaces are shown:

Display 101: MN 200
Display 102: WPG 401
Display 103: Schedule 300
Display 104: Schedule 300
Display 105: Schedule 300

The position of the crews changes in the master visualizer 200 according to the scheduled activities of the crews during the planning period.

In substep S523, the user identifies if there is a conflict for one of the crews. The following workspaces are shown:

Display 101: MV 200
Display 102: WPG 401
Display 103: Schedule 300
Display 104: Schedule 300
Display 105: Schedule 300

A visual clue in the master visualizer 200 indicates the crew(s) in conflict. The Schedule 300 workspace shows information about the conflict. In this way, scheduling conflicts are identified.

In substep S524, the user selects the activity causing the conflict from the Schedule 300 workspace. The following workspaces are shown:

Display 101: MV 200
Display 102: WPG 401
Display 103: Schedule 300
Display 104: Schedule 300
Display 105: Standard Operating Procedures (SOP)

An input form with details about the selected activity pops up in the Schedule 300 Workspace. A workspace containing the SOP is displayed.

In substep S525, the user selects the workspace for LOWIS™ and/or D7i™ and inputs production crew changes to resolve the conflict. The following workspaces are shown:

Display 101: MV 200
Display 102: WPG 401
Display 103: LOWIS™
Display 104: Schedule 300
Display 105: D7i™

After the data is input into LOWIS™ and D7i™, the user will refresh scheduler database 122 to reflect the new data. The Schedule 300 workspace will show no conflicts and the visual clues for conflict disappear in the MV 200. In this way, scheduling conflicts resolved.

In step S530, maintenance crew data is input. In substep S531, the user presses the "Input Crew Schedules" button in the work process guide 401. The following workspaces are shown:

Display 101: MV 200
Display 102: WPG 401
Display 103: LOWIS™
Display 104: Schedule 300
Display 105: D7i™

In substep S532, the user inputs maintenance crew data into LOWIS™ or D7i™ or the Schedule 300. The following Workspaces are shown:

Display 101: MV 200
Display 102: WPG 401
Display 103: LOWIS™

Display 104: Schedule 300
Display 105: D7i™
After the data is input into LOWIS™ and D7 μm, the user will refresh scheduler database 122. In this way, a streamlined scheduling process is achieved.
In step S540, crew conflicts are resolved. In substep S541, the user presses the "Resolve conflicts" button in the WPG 401. The following workspaces are shown:
Display 101: MV 200
Display 102: WPG 401
Display 103: Schedule 300
Display 104: Schedule 300
Display 105: Schedule 300
Each Schedule 300 workspace shows the information for a different crew. The user can select which of the seven crews they want to view: maintenance, production, construction, drilling, WEO, abandonment or HES.
In substep S542, the user operates the time slide bar 203 on the master visualizer 200 to scroll through the days of the planning period. The following workspaces are shown:
Display 101: MV 200
Display 102: WPG 401
Display 103: Schedule 300
Display 104: Schedule 300
Display 105: Schedule 300
The position of the crews changes in the master visualizer 200 according to the scheduled activities of the crews during the planning period.
In substep S543, the user identifies if there is a conflict for one of the crews. The following workspaces are shown:
Display 101: MV 200
Display 102: WPG 401
Display 103: Schedule 300
Display 104: Schedule 300
Display 105: Schedule 300
A visual clue in the master visualizer 200 indicates the crew(s) in conflict. The Schedule 300 workspace shows information about the conflict. In this way, scheduling conflicts are identified.
In substep S544, the user selects the activity causing the conflict from the Schedule 300 workspace. The following workspaces are shown:
Display 101: MV 200
Display 102: WPG 401
Display 103: Schedule 300
Display 104: Schedule 300
Display 105: SOP
An input form with details about the selected activity pops up in the Schedule 300 workspace. A workspace containing the SOP is displayed.
In substep S545, the user selects the workspace for LOWIS™ and/or D7i™ and inputs maintenance crew changes to resolve the conflict. The following workspaces are shown:
Display 101: MV 200
Display 102: WPG 401
Display 103: LOWIS™
Display 104: Schedule 300
Display 105: D7i™
After the data is input into LOWIS™ and D7 μm, the user will refresh scheduler database 122 to reflect the new data. The Schedule 300 workspace will show no conflicts and the visual clues for conflict disappear in the MV 200. In this way, scheduling conflicts are resolved.
In step S550, the schedule planning meeting is concluded.

2. Morning Field Scheduling Meeting

FIG. 4B is a schematic level 0 process flow diagram depicting in a preferred embodiment a morning field scheduling meeting guided work process 402. In step S600, maintenance work is reviewed. In step S610, daily activities are reviewed. In step S620, the meeting is concluded. While shown as forward flowing process, there are loops (as needed) to review all work crew schedules and remove all conflicts.

FIG. 6 is a schematic level process flow diagram depicting in a preferred embodiment a first level decomposition of the morning field scheduling meeting guided work process in FIG. 4B. The following is a description of a process for conducting a morning field scheduling meeting, i.e., an illustrative use case for using the master schedule visualizer system 100. The purpose of this meeting is to review the daily status of field operations and highlight potential conflicts in the schedule of planned crew activities in order to produce a mitigation plan to handle changes. The agenda for the meeting varies based on the current activity in the field. The meeting typically begins with a review of the planned maintenance work for the day. The meeting then progresses in a round robin fashion with each participant having the opportunity to provide information on activities that impact daily operations. The data and information that is viewed in the meeting will vary based on the problems that need to be addressed or decisions that need to be made. Participants in the meeting include: maintenance HO, construction rep, production, HES, electrician (operations), automation (operations), current production operator, current facilities operator and any other group working in the field has a representative at the meeting.

The master schedule visualizer 100 displays an interactive map of the field that uses icons to represent the locations of the crews that had scheduled activities for that day. In addition, the master schedule visualizer 100 has views of other key applications and data normally needed in the meeting. Since this meeting has a very dynamic nature, there may be a need to show more detailed information from, for example, D7i™. The next day it may be critical to see information from LOWIS™. It is therefore important that the master schedule visualizer 100 be flexible and provides an easy way for the user to access the necessary data or application.

Referring to FIG. 6, in step S600, maintenance work is reviewed. In substep S601, the master schedule visualizer 100, displays 101-105 and clients 110-112 are started. The display 102 displays the workspace work process guide 402. All other displays are black. The work process guide 402 has the following items:
1. Review maintenance work for the day
2. Review daily activities In substep S602, the user presses the "Review Maintenance Work" button in work process guide 402. The following workspaces are shown:
Display 101: MV 200
Display 102: WPG 402
Display 103: Schedule 300

Display 104: Schedule 300
Display 105: Schedule 300
The master visualizer 200 will display a map of oil field showing the location of wells, facilities and the maintenance crew. The Schedule 300 will show more detailed information. The purpose of this step is to share information with field personnel. In this way, the alignment of the team members around daily activities can be achieved.
In substep S603, the user clicks on an icon on the map. The user selects new workspaces as needed. The following workspaces are shown:
Display 101: MV 200
Display 102: WPG 402
Display 103: Detail on clicked item
Display 104: User selected Workspace
Display 105: User selected Workspace
If there is a question about a particular maintenance activity the user can click on a map icon to display additional information. The user can also select a new workspace that is configured to launch a specific application, like LOWIS™, D7i™, DSS™, etc. needed to answer questions about an activity.
In substep S604, the review of maintenance activities is concluded.
In step S610, daily activities are reviewed. In substep S611, the user presses the "Review Daily Activities" button in the work process guide 402. The following workspaces are shown:
Display 101: MV 200
Display 102: WPG 402
Display 103: Schedule 300
Display 104: Blank
Display 105: Blank
The master visualizer 200 will display a map of the oil field showing the location of wells, facilities and each crew. The Schedule 300 will show detailed information on the scheduled activity for each crew: maintenance, production, idle well testing, construction, drilling, WEO, abandonment or HES. The purpose of this step is to share information with field personnel. In this way, alignment of the team members around daily activities can be achieved.
In substep S612, the user launches an application from an "Application Launch List". The following Workspaces are shown:
Display 101: MV 200
Display 102: WPG 402
Display 103: Application 1 (Any application with associated data such as: Excel, Access, D7i, LOWIS, ProcessNet, etc. . . . )
Display 104: "Data Locations"
Display 105: "Application Launch List"
This step would be repeated as needed throughout the remainder of the meeting. Each meeting participant would have the option of displaying data and applications relevant to what they are discussing.
In substep S613, the review of daily activities is concluded.
In substep S620, the morning meeting is concluded.
3. Lease Review
Master schedule visualizer 100 may generate new work crew schedules rather than the processes of reviewing existing or previously determined work crew schedules described above. As with the above-discussed work processes for removing scheduling conflicts, in a preferred embodiment such a work process for creating work crews is guided. Work process 700 in FIG. 7 shows an exemplary guided work process for removing problem-solving and/or creating work crews, also referred to herein as a Lease Review Meeting use case. Again, the work process is displayed on one of displays 101-105, preferably a peripheral display 102-105. By clicking on each of the boxes 703 in the diagram, the relevant information for that particular step in the process will be displayed on the other displays 101-105. This information will be either a workspace or a domain-specific software application. In this way, the work process guide 700 will guide the users 113-115 through the process and make sure that the relevant information is available at the right place at the right time.
In step S800 of guided work process 700, action items for the lease review meeting are reviewed. In step S810, the production team scorecards (i.e., records of production performance) are reviewed in order to diagnose production problems in oil field operations. In step S820, the well test differences are reviewed. In step S830, the user reviews sliders. In step S840, the user reviews bad actors. In step S850, a steam flood performance check is performed. In step S860, a meeting wrap up is conducted. In step S870, the Lease Review Meeting concluded. While shown as forward-flowing process, there are loops (as needed) to review all work crew schedules and remove all conflicts. FIG. 8 is a schematic level 1 process flow diagram depicting in particular embodiments a first level decomposition of the process flow blocks in FIG. 7. The following is a description of a process for conducting a lease review meeting, i.e., an illustrative use case of using the master schedule visualizer 100. The lease review meeting is held on a bi-weekly basis and usually lasts about 2½ hours. The purpose of a lease review meeting is to review field and well performance data to identify well work candidates. Applications used during the meeting may include applications for analysis such as LOWIS™, D7i™, DSS™, Catalyst™, ProcessNet™ of Matrikon Inc. (Production engineering software) and Excel™. Meeting attendees preferably include, for example, a lift specialist, a production engineer, a production technologist, production operators, a lease manager and an operations supervisor.
By using the master schedule visualizer 100, the lease review meeting is more efficient which allows more time for proactive work. Additionally, groups of wells with similar problems can be quickly posted on the master schedule visualizer 100 3D map to visualize trends in the data.
In step S800, action items for the lease review meeting are reviewed. In substep S801, the master schedule visualizer 100, displays 101-105 and clients 110-112 are started. The display 102 displays the workspace work process guide 700. All other displays show a generic image. The work process guide 700 has the following items (agenda for the Lease Review):
1. Meeting introduction: review action items from last meeting
2. Review Production Team Scorecards
3. Review Well Test Differences >10 (−30 days)
4. Review "Sliders"
5. Review "Bad Actors"
6. Perform steam flood performance check
7. Meeting wrap up The purpose of this meeting is to gain consensus, and determine actionable tasks for specific team members. Also, the purpose of each agenda item is as follows:
1. Share information and update the team on performance to date.
2. Identify and review wells with a significant deviation in well test results.
3. Identify and review wells with a downward performance trend.
4. Identify and review wells with more than 3 failures/yr.
5. Identify heat management problems/opportunities.
6. Summarize meeting results.

In substep S802, the user presses the "Review Action items" button in the work process guide 700 and the following workspaces are shown:
Display 101: MV 200
Display 102: WPG 700
Display 103: Action item list in Excel™
Display 104: Generic image
Display 105: Generic image The team reviews the status of the action items from the last meeting. The purpose of this step is to communicate results and identify outstanding action items.

In step S810, the production team scorecards are reviewed. First, in substep S811, the user presses the "Review. Production Team Scorecards" button in the work process guide 700 and the following workspaces are shown:
Display 101: MV 200
Display 102: WPG 700
Display 103: LOWIS™
Display 104: Oilfield Production Plot
Display 105: Jobs pending in D7i™ and LOWIS™

Here, the team discusses production performance since the last review. The purpose of this step is to update the production team on the performance metrics. In this way, the alignment of the team members is achieved as the users begin reviewing the wells.

In substep S812, the user navigates to the LOWIS™ scorecard view and the following workspaces are shown:
Display 101: MV 200
Display 102: WPG 700
Display 103: LOWIS™—Scorecard View
Display 104: Oilfield Production Plot
Display 105: Jobs pending in D7i™ and LOWIS™

In step S820, the well test differences are reviewed. In substep S821, the user presses the "Review Well Test Differences" button in the work process guide 700 and the following workspaces are shown:
Display 101: MV 200
Display 102: WPG 700
Display 103: LOWIS™
Display 104: LOWIS™
Display 105: DSS™

The purpose of this step is to identify well candidates and to decide which well to view in more detail.

In substep S822, the user navigates to the well test difference list, production history graph and to the beam analysis workbench. The following workspaces are shown:
Display 101: MV 200
Display 102: WPG 700
Display 103: LOWIS™ Well Test Difference List
Display 104: LOWIS™: Beam Analysis Workbench
Display 105: DSS™ production history graph Here, the user utilizes LOWIS™ to sort the well difference list by efficiency. The beam analysis workbench displays dynamometer data (surface & downhole), POC (Pump Off Controller) set points, and pump efficiency. It also links to RTU (Remote Terminal Unit) Read-Write.

In substep S823, the user identifies a well from the well test difference list that needs further review. Also, the user navigates to beam well group status or analysis workbench, to the Catalyst graph and to job management. Workspaces are modified by the user as follows:
Display 101: MV 200
Display 102: WPG 700
Display 103: LOWIS™—Beam Well Group Status or Beam Analysis Workbench
Display 104: LOWIS™ Job Management
Display 105: DSS™ graph Catalyst data.

Here, the beam well group status shows daily runtimes, # of cycles, and SPMs. It also graphs run time/# of cycles historically. DSS graphs of (from well tests) oil, water, lead line T, casing pressure, cyclic steam volumes, fluid over pump and net displacement are displayed. Job management shows well maintenance history and the queue of planned jobs for a well. The purpose of this step is to identify a problem and to decide the action needed to correct the problem. Once action is decided, a job plan will be entered into LOWIS™ or work request created and prioritized in D7i™.

In substep S824, the user navigates to the create job plan screen in LOWIS™. The following workspaces are shown:
Display 101: MV 200
Display 102: WPG 700
Display 103: LOWIS™ Job Plan
Display 104: LOWIS™ Job Management
Display 105: DSS™ graph Catalyst data The purpose of this step is to create a job plan in LOWIS™.

In substep S825, the user selects the D7i™ workspace in the display 105 and navigates to the work request view. The following workspaces are shown:
Display 101: MV 200
Display 102: WPG 700
Display 103; LOWIS™ Job Plan
Display 104: LOWIS™ Job Management
Display 105: D7 μm Work Request The purpose of this step is to create a work request in D7i™.

In step S830, the user reviews sliders. In substep. S831, the user presses the "Review sliders" button in the work process guide 700. The following workspaces are shown:
Display 101: MV 200
Display 102: WPG 300
Display 103: LOWIS™
Display 104: LOWIS™
Display 105: DSS™

Here, the LOWIS™ well difference list is used to identify wells with downward trending performance. Also, graphs of (from well tests) oil, water, lead line temperature, casing pressure, cyclic and continuous steam volume, fluid over pump, net displacement are displayed. The user also uses DSS™. The purpose of this step is to identify well candidates and to decide which well to view in more detail.

In substep S832, the user navigates to the well test difference list. Here, the user identifies a well from the well test difference slider list that needs further review. The following workspaces are shown:
Display 101: MV 200
Display 102: WPG 700
Display 103: LOWIS™ Well Test Difference List
Display 104: LOWIS™
Display 105: DSS™
In this step, the user will use LOWIS™ to sort the well difference list by efficiency. The beam analysis workbench displays dynamometer data (surface & downhole), POC set points, and pump efficiency. It also links to RTU Read-Write.
In substep S833, the user navigates to the bean analysis workbench, and to the DSS™ graph. The following workspaces are shown:
Display 101: MV 200
Display 102: WPG 700
Display 103: LOWIS™ Well Test Difference List
Display 104: LOWIS™ Beam Analysis Workbench
Display 105: Graph of Catalyst data (DSS™)
The purpose of this step is to identify the problem and to decide the action needed to correct the problem. As a result, the job plan will be entered into LOWIS™ or work request created and prioritized in D7i™.
In substep S834, the user navigates to the create job plan screen in LOWIS™. The following workspaces are shown:
Display 101: MV 200
Display 102: WPG 700
Display 103: LOWIS™ Well Test Difference List
Display 104: LOWIS™ Job Plan
Display 105: Graph of Catalyst data (DSS™)
This would replace recording most of the "action items" generated. A job plan is created in LOWIS™.
In substep S835, the user selects the D7i™ workspace in the display 104 and navigates to the work request view. The following workspaces are shown:
Display 101: MV 200
Display 102: WPG 700
Display 103: LOWIS™ Well Test Difference List
Display 104: D7i™ work request
Display 105: (graph of Catalyst data (DSS™)
Here, the user creates a work request in D7i™.
In step S840, the user reviews bad actors. In substep S841, the user presses the "Review bad actors" button in the work process guide 700. The following workspaces are shown:
Display 101: MV 200
Display 102: WPG 700
Display 103: LOWIS™
Display 104: LOWIS™
Display 105: DSS™
In this step, the team discusses wells that have had work done >3 times during the year. This data comes from a LOWIS™ scorecard called job summary by month. The purpose of this step is to identify well candidates and to decide which well to view in more detail.
In substep S842, the user navigates to the bad actor list and the well production plot. Here, the user identifies a well from the bad actor list for further review. The Following workspaces are shown:
Display 101: MV 200
Display 102: WPG 700
Display 103: LOWIS™ Job Summary by Month: Bad Actor List
Display 104: LOWIS™
Display 105: DSS™ Well production plot
In substep S843, the user navigates to the well bore data and downhole mechanics views. Here, the user selects the Pumptrack™ workspace in the display 105. The following workspaces are shown:
Display 101: MV 200
Display 102: WPG 700
Display 103: LOWIS™ well bore data
Display 104: LOWIS™ Downhole mechanics
Display 105: Pumptrack™ Downhole pumps
The purpose of this step is to identify the problem and to decide the action needed to correct the problem. As a result, a job plan will be entered into LOWIS™ or work request created and prioritized in D7i™
In substep S844, the user navigates to the create job plan screen in LOWIS™. The following workspaces are shown:
Display 101: MV 200
Display 102: WPG 700
Display 103: LOWIS™ wellbore data
Display 104: LOWIS™ Job Plan
Display 105: Pumptrack™
In this step, a job plan is created in LOWIS™.
In substep S845, the user selects the D7i™ workspace in the display 105 and navigates to the work request view. The following workspaces are shown:
Display 101: MV 200
Display 102: WPG 700
Display 103: LOWIS™ wellbore data
Display 104: LOWIS™ Downhole mechanics
Display 105: D7i™ work request
In this step, a work request is created in D7i™.
In step S850, a steam flood performance check is performed. In substep S851, the user presses the "Perform steam flood performance check" button in the work process guide 700. The following workspaces are shown:
Display 101: MV 200
Display 102: WPG 700
Display 103: DSS™
Display 104: ProcessNet™: Splitigator
Display 105: Catalyst™
In this step, the team discusses steam flood performance. The data from DSS™ includes: production rates (O & W) wellhead temperature, and casing P and T. The data from Catalyst™ includes: rate, pressure, and uptime. Also steam quality by generators is shown if measured. The purpose of this step is to review response of pattern wells by looking for trends. Here, a status check on the performance of the steam flood is conducted. A streamlined process provides an opportunity to validate heat performance more often.
In substep S852, the user navigates to the necessary views. The following workspaces are shown:
Display 101: MV 200
Display 102: WPG 700
Display 103: DSS™ view
Display 104: ProcessNet™: Splitigator
Display 105: Catalyst™ view
In step S860, a meeting wrap up is conducted. In substep S861, the user presses the "Meeting Wrap up" button in the work process guide 700. The following workspaces are shown:
Display 101: MV 200
Display 102: WPG 700

Display 103: Excel™ Spreadsheet with action items or RMIS link

Display 104: Summary of job plans entered into LOWIS™

Display 105: Summary of job created in D7i™

In this step, the team reviews action items and the list of jobs created. The purpose of this step is to summarize the meeting results. Also, the LOWIS™ work is prioritized.

In step S870, the Lease Review Meeting concluded.

E. Other Implementations

Other embodiments of the present invention and its individual components will become readily apparent to those skilled in the art from the foregoing detailed description. As will be realized, the invention is capable of other and different embodiments, and its several details are capable of modifications in various obvious respects, all without departing from the spirit and the scope of the present invention. Accordingly, the drawings and detailed description are to be regarded as illustrative in nature and not as restrictive. It is therefore not intended that the invention be limited except as indicated by the appended claims.

What is claimed is:

1. A method for diagnosing production problems in oil field operations, the method comprising:
   (a) displaying on a first video monitor an oil field diagnosis process flow chart in a master schedule visualizer system, wherein each object in the flow chart is a selectable object and where the selectable objects comprise Review Well Test Differences, Review Sliders, Review Bad Actors, and Perform Steam Flood Performance Check, wherein each selectable object is associated with one or more incompatible domain-specific software applications from different third parties having separate scheduling capabilities, wherein one or more of the selectable objects indicates degradation of performance of a well based on historical operation of well characteristics;
   (b) selecting, in series, one or more of the selectable objects in the oil field diagnosis process flow chart, and upon selection
     (1) displaying on one or more additional video monitors, one or more reports extracted by a middle-ware software code segment layer from the associated domain-specific software applications;
     (2) listing any oil wells having production problems, the production problems identified based on a production history of each well, the listing including the well for which degradation of performance is indicated;
     (3) displaying any problem oil wells on an oil field map via a geographic information system;
     (4) visually identifying any commonalities among the displayed problem oil wells, wherein such commonalities are indicative of a common cause of the production problems; and
     (5) scheduling work in the associated domain-specific software applications sufficient to remedy the common cause;
   wherein scheduling work in the associated domain-specific software applications includes resolving one or more scheduling conflicts in a geographical area represented on the oil field map.

2. The method of claim 1 wherein:
   (a) the oil field map comprises oil well objects, oil field facility objects, surface work crew objects, sub-surface work crew objects, work equipment rig objects and safety zones objects;
   (b) wherein the oil field map is customizable by date, has a date selector tool, and wherein each of the oil well objects, oil field facility objects, surface work crew objects, sub-surface work crew objects, work equipment rig objects and safety zones objects comprise a date attribute and a location attribute;
   (c) wherein each of the work crew objects are coded by a visual indicator to indicate a type of work;
   (d) wherein user selection of a work crew object causes a text box to display having a description of the work associated with the work the crew object;
   (e) wherein a safety zone object is associated with a work crew object and has a radius attribute extending 360 degrees around the center of the work crew object for the distance set by the radius attribute.

3. The method of claim 2, wherein the surface work crew objects represent surface work crews comprising facility maintenance work crews, facility construction work crews, and cyclic steam work crews.

4. The method of claim 2, wherein the sub-surface work crew objects represent sub-surface work crews comprising service rig work crews, workover rig work crews, drilling work crews and well-logging work crews.

5. The method of claim 2, wherein the domain-specific software applications from which surface work crew objects are extracted comprise applications for facility maintenance, reservoir analysis, production analysis and construction management.

6. The method of claim 2, wherein the domain-specific software applications from which sub-surface work crew objects are extracted comprise applications for reservoir analysis, production analysis, well-logging analysis and crew and equipment management.

7. The method of claim 2, wherein the safety zone objects comprise no electromagnetic signal emission zones, no drilling zones, no cyclic steaming zones, no production zones, no hot-work zones and environmentally sensitive zones.

8. The method of claim 2, wherein the surface and sub-surface work crew objects are coded by a visual indicator selected from shape, color, text labeling, or mixtures thereof.

9. The method of claim 2, wherein the scheduling of work comprises
   utilizing a scheduling conflict engine to read the attributes of any adjacent oil well objects, oil field facility objects, surface work crew objects, sub-surface work crew objects, work equipment rig objects and safety zone objects; and
   returning a conflicts indicator if any conflicts exists.

10. The method of claim 2, wherein resolving one or more scheduling conflicts includes utilizing a scheduling conflict resolution engine to receive any conflict indicators, communicate with any domain-specific software application from which a conflicted work crew object was extracted, and return a revised, conflict-free work schedule.

11. The method of claim 1, wherein the oil field is a new oil field.

12. The method of claim 1, wherein the oil field is a producing oil field.

13. The method of claim 1, further comprising generating the map and objects with a master schedule visualizer system, the master schedule visualizer system comprising:

(a) the plurality of incompatible software applications, each having a different domain-specific functionality useful for oil field management and having a work crew scheduling code segment, each in communication with a dedicated database, each software application loaded into memory of a general purpose personal computer or general purpose server class computer;

(b) the middle-ware software code segment layer in communication with each of the domain-specific software applications for extracting work schedule data from each of the domain-specific software applications;

(c) the geographic information system in communication with the middle-ware software code segment layer for displaying an oil field map, oil well objects, oil field facility objects, surface and sub-surface work crew objects, and safety zones objects; and (d) a plurality of input devices operatively connected with the middle-ware software code segment layer for allowing a plurality of users to input instructions to the middle-ware software code segment layer and communicate with the software applications, wherein the first and one or more video monitors are operatively connected with the middle-ware software code segment layer and the geographic information system, for displaying the oil field map, oil well objects, oil field facility objects, surface and sub-surface work crew objects, and safety zones objects, and reports from the domain-specific software applications.

14. A master schedule visualizer system comprising:

(a) a plurality of incompatible domain-specific software applications from different third parties, each having a different domain-specific functionality useful for oil field management and having a separate work crew scheduling code segment, each in communication with a dedicated database, each software application loaded into memory of a general purpose personal computer or general purpose server class computer;

(b) a middle-ware software code segment layer in communication with each of the domain-specific software applications for extracting work schedule data from each of the domain-specific software applications;

(c) a geographic information system in communication with the middle-ware software code segment layer for displaying an oil field map, oil well objects, oil field facility objects, surface work crew objects, sub-surface work crew objects, work equipment rig objects and safety zone objects;

(d) plurality of video monitors operatively connected with the middle-ware software code segment layer and the geographic information system, for displaying the oil field map, oil well objects, oil field facility objects, surface work crew objects, sub-surface work crew objects, work equipment rig objects, and safety zones objects, and reports from the software applications, and (e) a plurality of input devices operatively connected with the middle-ware software code segment layer for allowing a plurality of users to input instructions to the middle-ware software code segment layer and communicate with the software applications, wherein the master schedule visualizer system (1) displays on a first video monitor of the plurality of video monitors an oil field diagnosis process flow chart that includes a plurality of selectable objects that comprise Review Well Test Differences, Review Sliders, Review Bad Actors, and Perform Steam Flood Performance Check, wherein each selectable object is associated with one or more of the incompatible domain-specific software applications, wherein one or more of the selectable objects indicates degradation of performance of a well based on historical operation of well characteristics;

(2) provides for selection of one or more of the selectable objects in the oil field diagnosis process flow chart, and upon selection (i) displays on one or more additional video monitors of the plurality of video monitors, one or more reports extracted by the middle-ware software code segment layer from the associated domain-specific software applications;

(ii) lists any oil wells having production problems, the production problems identified based on a production history of each well, the listing including the well for which degradation of performance is indicated;

(iii) displays any problem oil wells on the oil field map via a geographic information system;

(iv) provides for visual identification of any commonalities among the displayed problem oil wells, wherein such commonalities are indicative of a common cause of the production problems; and (v) allows scheduling of work in the associated domain-specific software applications sufficient to remedy the common cause;

wherein scheduling of work in the associated domain-specific software applications includes resolving one or more scheduling conflicts in a geographical area represented on the oil field map.

15. The system of claim 14 wherein:

(a) the oil field map displays the oil well objects, oil field facility objects, surface work crew objects, sub-surface work crew objects, work equipment rig objects and safety zones objects;

(b) wherein the oil field map is customizable by date, has a date selector tool, and wherein each of the oil well objects, oil field facility objects, surface work crew objects, sub-surface work crew objects, work equipment rig objects and safety zones objects comprise a date attribute and a location attribute;

(c) wherein each of the work crew objects are coded by a visual indicator to indicate a type of work;

(d) wherein user selection of a work crew object causes a text box to display having a description of the work associated with the work the crew object;

(e) wherein a safety zone object is associated with a work crew object and has a radius attribute extending 360 degrees around the center of the work crew object for the distance set by the radius attribute.

16. The system of claim 14, wherein the surface work crew objects represent surface work crews comprising facility maintenance work crews and cyclic steam work crews.

17. The system of claim 14, wherein the sub-surface work crew objects represent sub-surface work crews comprising service rig work crews, workover rig work crews, drilling work crews and well-logging work crews.

18. The system of claim 14, wherein the domain-specific software applications from which surface work crew objects are extracted comprise applications for facility maintenance, reservoir analysis, production analysis and construction management.

19. The system of claim 14, wherein the domain-specific software applications from which sub-surface work crew objects are extracted comprise applications for reservoir analysis, production analysis, well-logging analysis and crew and equipment management.

20. The system of claim 14, wherein the safety zone objects comprise no electromagnetic signal emission zones, no drilling zones, no cyclic steaming zones, no production zones, no hot-work zones and environmentally sensitive zones.

21. The system of claim 14, wherein the surface and sub-surface work crew objects are coded by a visual indicator selected from shape, color, text labeling, or mixtures thereof.

22. The system of claim 14, further comprising a scheduling conflict engine that reads the attributes of any adjacent the oil well objects, oil field facility objects, surface work crew objects, sub-surface work crew objects, work equipment rig objects and safety zones objects and returns a conflicts indicator if any conflicts exists.

23. The system of claim 14, wherein resolving one or more scheduling conflicts includes utilizing a scheduling conflict resolution engine to receive any conflict indicators, communicate with any domain-specific software application from which a conflicted work crew object was extracted, and return a revised, conflict-free work schedule.

24. The system of claim 14, wherein the oil field is a new oil field.

25. The system of claim 14, wherein the oil field is a producing oil field.

\* \* \* \* \*